United States Patent
Sugita et al.

(10) Patent No.: US 8,730,431 B2
(45) Date of Patent: May 20, 2014

(54) LIQUID CRYSTAL DISPLAY DEVICE

(75) Inventors: Tatsuya Sugita, Takahagi (JP); Masaya Adachi, Hitachi (JP)

(73) Assignee: Japan Display Inc., Tokyo (JP)

( * ) Notice: Subject to any disclaimer, the term of this patent is extended or adjusted under 35 U.S.C. 154(b) by 145 days.

(21) Appl. No.: 13/227,700

(22) Filed: Sep. 8, 2011

(65) Prior Publication Data

US 2012/0069272 A1    Mar. 22, 2012

(30) Foreign Application Priority Data

Sep. 17, 2010    (JP) ................................. 2010-209028

(51) Int. Cl.
*G02F 1/1335*    (2006.01)

(52) U.S. Cl.
USPC ............................................ 349/64; 349/65

(58) Field of Classification Search
USPC ............................................ 349/64, 65, 115
See application file for complete search history.

(56) References Cited

U.S. PATENT DOCUMENTS

| | | | |
|---|---|---|---|
| 6,020,944 A * | 2/2000 | Hoshi | 349/62 |
| 2004/0105617 A1 * | 6/2004 | Cornelissen et al. | 385/31 |
| 2007/0201246 A1 * | 8/2007 | Yeo et al. | 362/627 |
| 2008/0055881 A1 * | 3/2008 | O'Neill et al. | 362/19 |
| 2008/0239200 A1 * | 10/2008 | Hirai et al. | 349/62 |
| 2009/0027600 A1 * | 1/2009 | Hisatake | 349/98 |

FOREIGN PATENT DOCUMENTS

JP        2007298634        11/2007

* cited by examiner

*Primary Examiner* — Michael Caley
(74) *Attorney, Agent, or Firm* — Ulmer & Berne LLP

(57) ABSTRACT

The backlight has an anisotropic diffusion sheet disposed between the reflective polarizing plate and the optical path converter. The anisotropic diffusion sheet includes a refractive index anisotropic diffusion sheet stretched in an absorption axis direction in which a concave-convex portion is formed on a surface of the reflective polarized plate, and an isotropic material part laminated on a surface of the concave-convex part. The isotropic material part has an isotropic reflective index. The refractive index of the isotropic material part is the same as the refractive index in the transmission axis direction perpendicular to a stretching direction of the refractive index anisotropic sheet.

7 Claims, 7 Drawing Sheets

LIQUID CRYSTAL DISPLAY DEVICE

CLAIM OF PRIORITY

The present application claims priority from Japanese Patent Application JP 2010-209028 filed on Sep. 17, 2010, the content of which is hereby incorporated by reference into this application.

FIELD OF THE INVENTION

The present invention relates to a liquid crystal display device having a backlight for emitting light from the back side of a liquid crystal panel.

BACKGROUND OF THE INVENTION

In the conventional liquid crystal display device including a backlight for emitting light from the back side of a liquid crystal panel, an image is displayed on the liquid crystal panel by the light emitted from the backlight. In such a liquid crystal display device, the liquid crystal panel includes a pair of transparent substrates, a liquid crystal material interposed between the pair of transparent substrates, and a pair of polarizing plates provided on the front side and back side of the liquid crystal panel. The polarization state of the light incident to the liquid crystal material is changed by the pair of polarizing plates.

In this configuration, when the light is emitted from the backlight, linearly polarized light in the absorption axis direction of the polarizing plate is absorbed by the polarizing plate on the back of the liquid crystal display panel. Thus, in order to increase the brightness while reducing power consumption, there has been proposed a technique (see, for example, JP-A No. 298634/2007) in which a reflective polarizing plate is provided between the back-side polarizing plate and the backlight. The linearly polarized light in the absorption axis is previously reflected in the direction of the backlight by the reflective polarizing plate. Then, the reflected light is reflected again by the liquid crystal panel. In this way, the linearly polarized light in the absorption axis direction is reused. Here, the linearly polarized light in the absorption axis direction is the same meaning as the linearly polarized light having a vibrating surface in the absorption axis direction.

The reflective polarizing plate described in JP-A No. 298634/2007 has a laminate configuration in which a light scattering film is laminated on the light incident side of the reflective polarizer. The light scattering film is laminated so that the transmission axis of the reflective polarizer is parallel to a given direction in the film plane of the light scattering film.

The polarization component necessary for liquid display is transmitted through the light scattering film in the given direction. Then, the polarization component is also transmitted through the reflective polarizer in the transmission axis direction.

On the other hand, of the polarization components not used for liquid display, the linearly polarized light transmitted in the direction perpendicular to the given direction of the light scattering film is reflected in the orthogonal direction of the transmission axis of the reflective polarizer, and is returned again to the light scattering film. The polarization component incident again in the X direction of the light scattering film is scattered backward on the side of the reflective polarizer. As a result, the scattered light is depolarized. Then, the depolarized light is input again to the reflective polarizer.

The linearly polarized light in the transmission axis direction of the reflective polarizing plate is transmitted, and the linearly polarized light orthogonal to the transmission axis is reflected again and returned in the direction of the light scattering film. This process is repeated to increase the amount of light input to the liquid crystal cell.

However, in the liquid crystal display device including the reflective polarizing plate of JP-A No. 298634/2007, there is no consideration of the linearly polarized light that is transmitted through the back-side polarizing plate, and then reflected in the direction of the backlight by the back side of the liquid crystal panel, such as the wiring of the liquid crystal panel. The linearly polarized light even in the transmission axis direction in the backlight is also depolarized in a similar way to the linearly polarized light in the absorption direction that is reflected by the reflective polarizing plate. This reduces the reuse efficiency of the light reflected by the back side of the liquid crystal panel. As a result, the power supply must be increased to increase the brightness.

SUMMARY OF THE INVENTION

The present invention addresses the above identified problems by providing a liquid crystal display device capable of increasing the brightness while reducing power consumption.

In order to solve the above problem and achieve the above object, a liquid crystal display device according to the present invention includes a reflective polarizing plate disposed on a back side of a liquid crystal panel. The reflective polarizing plate is used to reflect linearly polarized light in an absorption axis direction of the polarizing plate towards a direction of the backlight, and transmit linearly polarized light in a transmission axis direction of the polarizing plate. The liquid crystal display device according to the present invention also includes an optical path converter in which a prism row is formed to direct light output from a light guide plate towards the liquid crystal panel. The backlight has an anisotropic diffusion sheet provided between the reflective polarizing plate and the optical path converter. The anisotropic diffusion sheet has a refractive index anisotropic diffusion sheet stretched in the absorption axis direction of the back-side polarizing plate. The refractive index anisotropic diffusion sheet has a concave-convex portion formed in a concave convex shape on a surface on the side of the reflective polarizing plate. Further, the anisotropic diffusion sheet also has an isotropic material part laminated on a surface of the concave-convex portion. The isotropic material part has an isotropic refractive index. The refractive index of the isotropic material part is the same as a refractive index in the transmission axis direction perpendicular to a stretching direction of the refractive index anisotropic sheet.

In the liquid crystal display device according to the present invention, it is preferable in this invention that the anisotropic diffusion sheet is formed such that an absolute value of a difference between a refractive index in the absorption axis direction and a refractive index in the thickness direction is greater than an absolute value of a difference between the refractive index in the transmission axis direction and the refractive index in the thickness direction.

In the liquid crystal display device according to the present invention, it is preferable in this invention that the concave-convex portion has a plurality of convex portions formed in an elliptical shape. The convex portions have a bottom cross section orthogonal to the thickness direction, in which a longitudinal direction is the stretching direction of the refractive index anisotropic sheet.

In the liquid crystal display device according to the present invention, it is preferable in this invention that the concave-convex portion is formed by a hot embossing process.

In the liquid crystal display device according to the present invention, it is preferable in this invention that the anisotropic diffusion sheet is formed by laminating a flattening sheet having a flat surface on a surface of the isotropic material part.

In the liquid crystal display device according to the present invention, it is preferable in this invention that the anisotropic diffusion sheet is formed by laminating a plurality of sheets.

In the liquid crystal display device according to the present invention, it is preferable in this invention that the concave-convex portion is a diffraction grating formed in a concave convex shape.

Further, in order to solve the above problem and achieve the above object, a liquid crystal display device according to the present invention includes a reflective polarizing plate disposed on a back side of a liquid crystal panel. The reflective polarizing plate is used to reflect linearly polarized light in an absorption axis direction of the polarizing plate towards a direction of a backlight, and transmit linearly polarized light in a transmission axis direction of the polarizing plate. Further, the liquid crystal display device according to the present invention also includes an optical path converter in which a prism row is formed to direct light output from the light guide plate towards the liquid crystal panel. The backlight has an anisotropic diffusion sheet provided between the reflective polarizing plate and the optical path converter. The anisotropic diffusion sheet has a diffraction grating formed in a concave convex shape on a surface of the anisotropic diffusion sheet. The anisotropic diffusion sheet is arranged such that grooves of the diffraction grating are parallel to the absorption axis direction.

In the liquid crystal display device according to the present invention, the linearly polarized light in the absorption axis direction that is reflected on the reflective polarizing plate and returned in the direction of the backlight is scattered on the surface of the concave-convex portion by the difference in the refractive index between the isotropic material part and the refractive index anisotropic sheet. As a result, the scattered light is depolarized. On the other hand, the linearly polarized light in the transmission axis direction is transmitted through the polarizing plate on the back side of the liquid crystal panel, and then reflected in the direction of the backlight by the back side of the liquid crystal panel such as the wiring of the liquid crystal panel. In this case, the linearly polarized light is not scattered because the refractive index in the transmission axis direction of the refractive index anisotropic sheet is the same as the refractive index of the isotropic material part. Thus, the linearly polarized light is transmitted with the polarization kept in the transmission axis direction through the anisotropic diffusion sheet. This increases the reuse efficiency of the light reflected on the back side of the liquid crystal panel. As a result, it is possible to increase the brightness while reducing power consumption.

DETAILED DESCRIPTION OF THE PREFERRED EMBODIMENTS

Hereinafter, preferred embodiments of a liquid crystal display device according to the present invention will be described in detail with reference to the accompanying drawings.

First Embodiment

Figure 1:
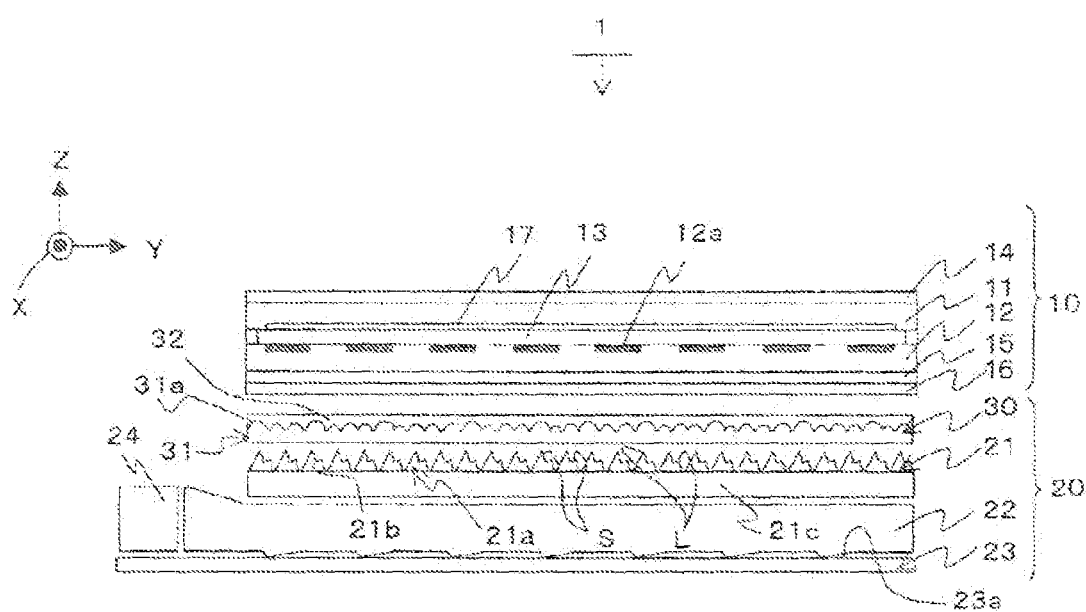
FIG. 1 is a schematic diagram of the general configuration of a liquid crystal display device according to a first embodiment of the present invention.
Figure 2:
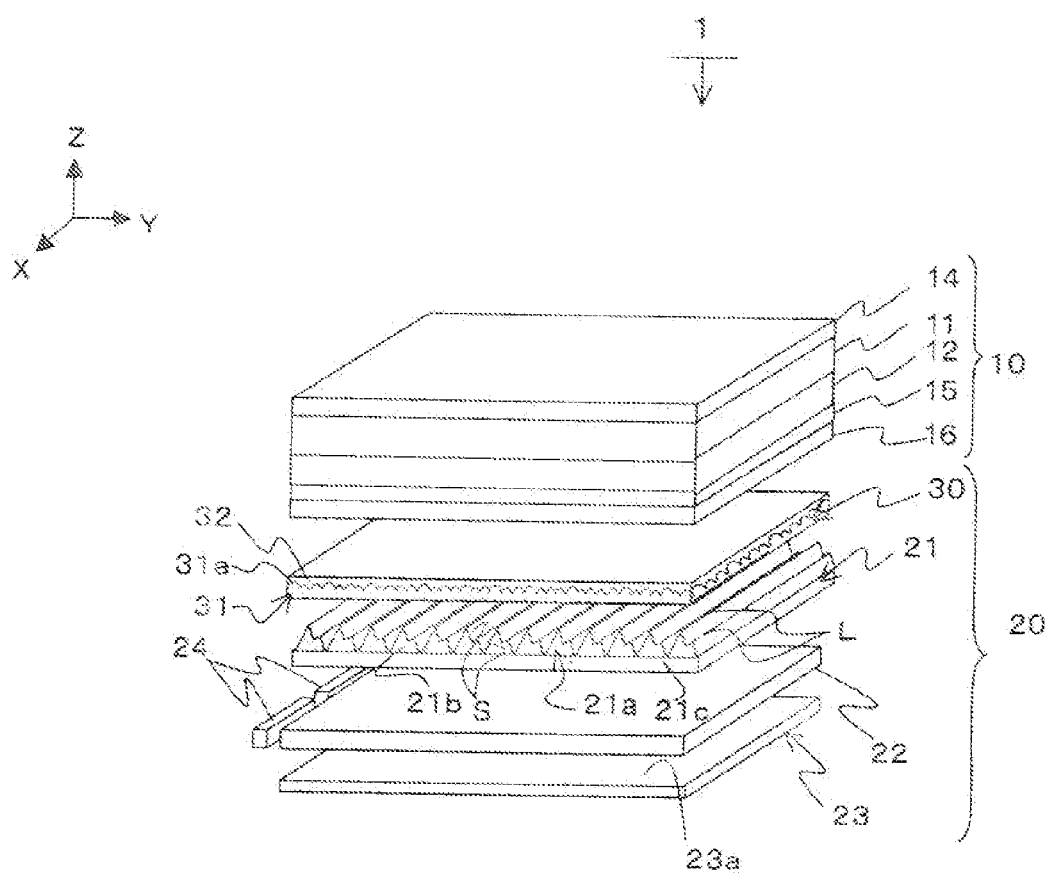
FIG. 2 is a perspective view of the liquid crystal display device shown in FIG. 1.
Figure 3:
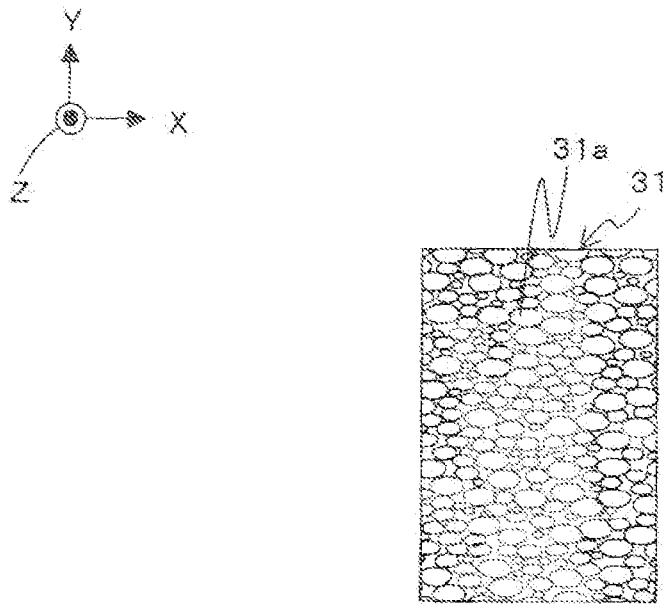
FIG. 3 is a front view of a refractive index anisotropic sheet shown in FIG. 1.
Figure 4:
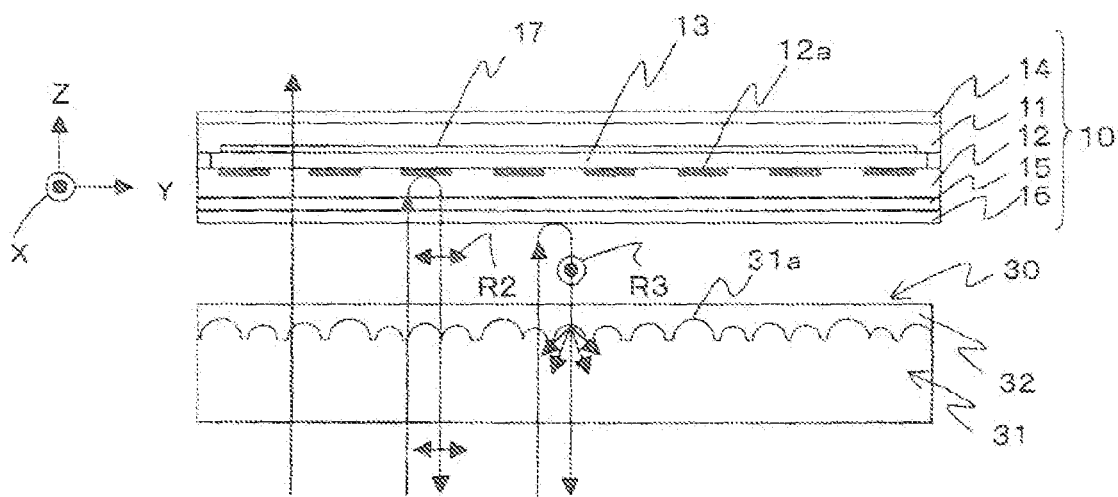
FIG. 4 is a diagram showing the linearly polarized light transmitted with the polarization kept in an anisotropic diffusion sheet, as well as the linearly polarized light scattered and depolarized.

FIG. 1 is a schematic diagram of the general configuration of a liquid crystal display device 1 according to a first embodiment of the present invention. FIG. 2 is a perspective view of the liquid crystal display device 1 shown in FIG. 1. FIG. 3 is a front view of a refractive index anisotropic sheet 31 shown in FIG. 1. FIG. 4 is a diagram showing a linearly polarized light R2 transmitted with the polarization kept in an anisotropic diffusion sheet 30, as well as a linearly polarized light R3 that is scattered and depolarized. Note that in FIGS. 1 to 4, the transmission axis direction of a back-side polarizing plate 15 is defined as the Y axis, the absorption axis direction of the back-side polarizing plate 15 is defined as the X axis, and the normal direction on the XY axis plane is defined as the Z axis.

The liquid crystal display device 1 is an active matrix method. The liquid crystal display device 1 includes a liquid crystal panel 10, a backlight 20, and a control unit not shown.

The liquid crystal panel 10 includes a pair of transparent substrates of a first transparent substrate 11 and a second transparent substrate 12, a liquid crystal material 13 interposed between the pair of transparent substrates, a pair of polarizing plates of a front-side polarizing plate 14 and the back surface polarizing plate 15, and a reflective polarizing plate 16.

The first transparent substrate 11 is formed from a glass material and the like. The first transparent substrate 11 is a plate-like substrate transparent to visible light. In the first transparent substrate 11, a color filter 17 is formed on the surface on the side of a liquid crystal material 13. Further, an oriented film not shown is formed on the surface of the color filter 17.

The second transparent substrate 12 is formed from a glass material and the like. The second transparent substrate 12 is a plate-like substrate transparent to visible light. In the second transparent substrate 12, electrodes not shown, signal lines 12a, thin film transistors not shown, and the like, are formed on the surface on the side of the liquid crystal material 13, to form a plurality of pixels arranged in a matrix form. Further, the second transparent substrate 12 is formed on the surface were the oriented film not shown comes into contact with the liquid crystal material 13.

The front-side polarizing plate 14 is provided on the surface opposite to the liquid crystal material 13 of the first transparent substrate 11. The front-side polarizing plate 14 absorbs linearly polarized light in a given direction, and transmits linearly polarized light having a vibrating surface orthogonal to the linearly polarized light in the given direction. In other words, the front-side polarizing plate 14 has the absorption axis to absorb the linearly polarized light in the given direction, as well as the transmission axis to transmit the linearly polarized light whose vibrating surface is orthogonal to the linearly polarized light to be absorbed.

The back-side polarizing plate 15 is provided on the surface of the second transparent substrate 12 that is opposite to the liquid crystal material 13. In other words, the back-side polarizing plate 15 is provided on the back side of the liquid crystal panel 10. The back-side polarizing plate 15 absorbs linearly polarized light in a given direction, and transmits linearly polarized light whose vibrating surface is orthogonal to the linearly polarized light to be absorbed. In other words, the back-side polarizing plate 15 has the absorption axis to absorb the linearly polarized light in the given direction, as well as the transmission axis to transmit the linearly polarized light whose vibrating surface is orthogonal to the linearly polarized light to be absorbed. Further, the back-side polarizing plate 15 is arranged so that the absorption axis direction of the back-side polarizing plate 15 is orthogonal to the absorption axis of the front-side polarizing plate 14. In other words, the front-side polarizing plate 14 and the back-side polarizing plate 15 are arranged in a Cross Nicole state.

The reflective polarizing plate 16 is attached to the surface of the back-side polarizing plate 15 that is opposite to the surface of the liquid crystal material 13. The reflective polarizing plate 16 transmits the linearly polarized light in the transmission axis direction of the back-side polarizing plate 15, and reflects the linearly polarized light in the absorption axis direction of the back-side polarizing plate 15.

The backlight 20 is used to illuminate the display area of the liquid crystal panel 10. The backlight 20 uses the edge light method. The backlight 20 includes the anisotropic diffusion sheet 30, a prism sheet 21, a light guide plate 22, a reflection sheet 23, and a light source 24.

The anisotropic diffusion sheet 30 is provided between the reflective polarizing plate 16 and the prism sheet 21. The anisotropic diffusion sheet 30 includes the refractive index anisotropic sheet 31 and an isotropic material part 32. The refractive index anisotropic sheet 31 is a sheet of uniaxially-stretched polyethylene terephthalate (PET), which is stretched in the absorption axis direction of the back-side polarizing plate 15. Assuming that the refractive indices in the X, Y, and Z directions are nx, ny, and nz, the refractive index anisotropic sheet 31 satisfies $|nx-nz|>|ny-nz|$.

Note that in the first embodiment of the present invention, the refractive index anisotropic sheet 31 is a sheet with uniaxial anisotropy. Thus, the refractive indices nx, ny, nz in the X, Y, and Z directions are given by nx=ne, ny=nz=n0. Here, the refractive index ne represents the extraordinary ray refractive index, and the refractive index n0 represents the ordinary ray refractive index. For example, the refractive index ne and the refractive index n0 are set to n0=1.53 and ne=1.71, respectively.

Further, the refractive index anisotropic sheet 31 has a concave-convex portion 31a. The concave-convex portion 31a is a part formed in a concave convex shape on the surface of the refractive index anisotropic sheet 31, in order to scatter the linearly polarized light reflected from the reflective polarizing plate 16. As shown in FIG. 3, the concave-convex portion 31a has a plurality of convex portions formed in an elliptical shape. The convex portions have a bottom cross section orthogonal to the thickness direction, in which a longitudinal direction is the X axis direction. The concave-convex portion 31a is formed by a hot embossing process. Here, the hot embossing process is the method for pattern transfer by pressing a heated plate generally called hot emboss against a resin film.

The isotropic material part 32 is a layer formed on the surface of the concave-convex portion 31a of the refractive index anisotropic sheet 31, to planarize the surface of a concave convex shape of the concave-convex portion 31a. The isotropic material part 32 has an isotropic refractive index nt. The refractive index nt is the same as the refractive index ny (=refractive index n0) of the refractive index anisotropic sheet 31.

The prism sheet 21 is provided between the anisotropic diffusion sheet 30 and the light guide plate 22. The prism sheet 21 serves as an optical path converter for directing the light output from the light guide plate 22 to the front of the back side of the liquid crystal panel 10. The prism sheet 21 includes a prism row part 21a and a base film part 21c.

The prism row part 21a is the part in which a plurality of prisms 21b are arranged in a row on the surface of the base film part 21c. Each prism 21b has a slope S in which a step is formed. In the prism row part 21a, the prisms 21b are arranged so that the ridges of the individual prisms 21b extend along the side of the edge of the light guide plate 22 to which the light from the light source 24 is incident. In other words, the prism row part 21a is arranged so that the ridges L of the individual prisms 21b are aligned in a row parallel to the X axis direction.

The prism 21b is formed so as to deflect the direction of travel of the light output from the light guide plate 22 and input to the prism sheet 21 towards the front of the back side of the liquid crystal panel 10. Since the step is formed on the slope S of each prism 21b, the prism sheet 21 has a function of reducing the coloring due to scattering of the wavelength with the refractive index of the prism material.

The base film part 21c is a film which is the base of the prism sheet 21. This film is formed, for example, from polyethylene terephthalate (PET). The base film part 21c is the film transparent to visible light. The base film part 21c is provided in such a way that the optic axis of the base film part 21c is substantially parallel or substantially perpendicular to the transmission axis of the back-side polarizing plate 15.

With such a prism sheet 21, the polarization in the direction perpendicular to the ridge L of the prism 21b is output more strongly. Thus, the ridge L of the prism 21b is perpendicular to the transmission axis of the back-side polarizing plate 15. In this way, it is possible to increase the amount of light transmitted through the back-side polarizing plate 15. In addition, the ridges L are perpendicular or parallel to the polarization direction (the absorption axis direction or the transmission axis direction) with a single prism sheet 21. With this configuration, the polarization reflected and returned from the back side of the liquid crystal panel 10 is unlikely to be broken. Note that the number of prism sheets 21 is not limited to one, and a plurality of prism sheets 21 can also be used. In this case, the prism sheets 21 are arranged so that the ridges L of the individual prisms 21b are parallel to each other.

The light guide plate 22 is used to output the light that is input from the edge by the light source 24, from the surface of the light guide plate 22 in a planar fashion. The light guide plate 22 is provided between the prism sheet 21 and the reflection sheet 23. The light guide plate 22 is formed from a synthetic resin, and the like, which is a plate-like member transparent to visible light.

The reflection sheet 23 is used to reflect the light output from the light guide plate 22 to return to the light guide plate 22. The reflection sheet 23 has a reflection surface 23a with high reflectivity on the surface of the synthetic resin sheet. For example, the reflection surface 23a is formed by depositing a metal with high reflectivity, such as silver, on the surface of the synthetic resin sheet. In the reflection sheet 23, the reflection surface 23a is provided on the surface of the light guide plate 22 that is opposite to the side of the liquid crystal panel 10.

For example, the light source 24 is realized by a light emitting diode (LED) that emits white light. A plurality of light sources 24 are mounted on the edge of the light guide plate 22. Note that the number of light sources 24 can be adjusted as needed.

The control unit not shown is realized by a CPU and the like. The control unit is electrically coupled to the components of the liquid crystal display device 1 including the liquid crystal panel 10 and the backlight 20, to control all of the operation of the liquid crystal display device 1. In addition, the control unit has a memory and the like to temporarily store image data input from an external system.

With the backlight 20 described above, as shown in FIG. 4, the linearly polarized light R3 in the X axis direction that is reflected by the reflective polarizing plate 16 and returned to the direction of the backlight 20 is input to the isotropic material part 32. Since the surface of the isotropic material part 32 is flat, the linearly polarized light R3 is prevented from being scattered and is input to the isotropic material part 32.

Then, the linearly polarized light R3 enters the boundary between the isotropic material part 32 and the refractive index anisotropic sheet 31. The linearly polarized light R3 is scattered on the surface of the concave-convex portion 31a by the difference |nx−nt| in the refractive index between the isotropic material part 32 and the refractive index anisotropic sheet 31. As a result, the scattered light is depolarized. Here, the concave-convex portion 31a has a plurality of convex portions formed in an elliptical shape. The convex portions have a bottom cross section orthogonal to the thickness direction, in which the longitudinal direction is the X axis direction. Thus, the linearly polarized light R3 reflected from the reflective polarizing plate 16 is scattered more strongly in the direction perpendicular to the X axis direction. As in the case of the liquid crystal display device 1 of the first embodiment, the backlight 20 using the prism sheet 21 reduces the view angle in the direction perpendicular to the ridges L of the prisms 21b. However, the use of the concave-convex portion 31a increases the view angle by scattering the light more strongly in the direction perpendicular to the ridge L of the prism 21b.

Further, the linearly polarized light R2 in the Y axis direction (the transmission axis direction) is transmitted through the back-side polarizing plate 15, and then reflected in the direction of the backlight 20 by the back side of the liquid crystal panel 10, such as the wiring 12a of the liquid crystal panel 10. Then, the linearly polarized light R2 is input to the isotropic material part 32. Since the surface of the isotropic material part 32 is flat, the linearly polarized light R2 is prevented from being scattered and is input to the isotropic material part 32.

Then, the linearly polarized light R2 enters the boundary between the isotropic material part 32 and the refractive index anisotropic sheet 31. At this time, the linearly polarized light R2 is not scattered because the refractive index ny in the Y axis direction of the refractive index anisotropic sheet 31 is the same as the refractive index nt of the isotropic material part 32. Thus, the linearly polarized light R2 is transmitted with the polarization kept in the Y axis direction through the anisotropic diffusion sheet 30. In order to reuse more of the light that is transmitted through the back-side polarizing plate 15 and then reflected from the back side of the liquid crystal panel 10, it is preferable to provide a film with high reflectivity, such as a metal film, in a non-opening portion.

When the linearly polarized light is incident to the backlight 20, the depolarization ratio α is defined as $$\alpha = Ic/Ip \qquad (1)$$

where Ip is the brightness of the reflected light with polarization in the same direction as the incident polarized light, and Ic is the brightness of the reflected light with polarization in the direction perpendicular to the incident polarized light. At this time, it is preferable that the depolarization ratio α of the linearly polarized light reflected from the reflective polarizing plate is large, and that the depolarization ratio α of the linearly polarized light reflected in the direction of the backlight 20 by the back side of the liquid crystal panel 10 is small. In order to effectively obtain the effect of reusing light by the reflective polarizing plate, the depolarization ratio α of the linearly polarized light reflected from the reflective polarizing plate is preferably 0.7 or more, and more preferably, 0.8 or more. On the other hand, in order to effectively reuse the linearly polarized light reflected in the direction of the backlight 20 by the back side of the liquid crystal panel 10, the depolarization ratio α of the linearly polarized light in this direction is preferably 0.5 or less, and more preferably, 0.4 or less.

In the liquid crystal display device 1 according to the first embodiment of the present invention, the linearly polarized light in the absorption axis direction is reflected by the reflective polarizing plate 16, and then returned in the direction of the backlight 20. In this case, the linearly polarized light is scattered on the surface of the concave-convex portion 31a by the difference in the refractive index between the isotropic material part 32 and the refractive index anisotropic sheet 31. As a result, the scattered light is depolarized. Further, the linearly polarized light in the transmission axis direction is transmitted through the back-side polarizing plate 15 of the liquid crystal panel 10, and then reflected in the direction of the backlight 20 by the back side of the liquid crystal panel 10, such as the wiring 12a of the liquid crystal panel 10. In this case, the linearly polarized light is not scattered because the refractive index in the transmission axis direction of the refractive index anisotropic sheet 30 is the same as the refractive index of the isotropic material part 32. Thus, the linearly polarized light is transmitted with the polarization kept in the transmission axis direction through the anisotropic diffusion sheet 30. This can increase the efficiency of reuse of the light reflected on the back side of the liquid crystal panel 10. As a result, it is possible to increase the brightness while reducing power consumption.

Further, in the liquid crystal display device 1 according to the first embodiment of the present invention, the concave-convex portion 31a is formed by the hot embossing process to scatter light by the concave-convex portion 31a. The adjustment of the refractive index is easier with this method than when the light is scattered by a film formed by stretching a material in which scattering phases, such as fine particles, are dispersed in a matrix phase. In other words, the refractive index should be adjusted by taking into account the uniform scattering of fine particles while preventing aggregation and void.

Further, according to the first embodiment of the present invention, the refractive index anisotropic sheet 31 has a plurality of convex portions formed in an elliptical shape. The convex portions have a bottom cross section orthogonal to the thickness direction, in which the longitudinal direction is the X axis direction. This makes it possible to more strongly diffuse the linearly polarized light reflected from the reflective polarizing plate 16 in the direction perpendicular to the X axis direction. As a result, the view angle can be increased also in the case in which the backlight 20 uses the prism sheet 21 as means of optical path conversion.

Further, according to the first embodiment of the present invention, the light emitted to the liquid crystal panel 10 by the anisotropic diffusion sheet 30 is scattered to reduce the occurrence of moiré caused by the periodicity of the prism sheet 21.

Note that in the first embodiment of the present invention, the concave-convex portion 31a has the convex portions in an elliptical shape, having a bottom cross section orthogonal to the thickness direction in which the longitudinal direction is the X axis direction. However, the present invention is not limited to this example. In other words, the concave-convex 31a is formed at least in a concave-convex shape to be able to scatter light. For example, it is possible to form concave portions in a hemispherical shape in which the radius in the X axis direction is the same as the radius in the Y axis direction, and possible to join them in the X axis direction.

Figure 5:
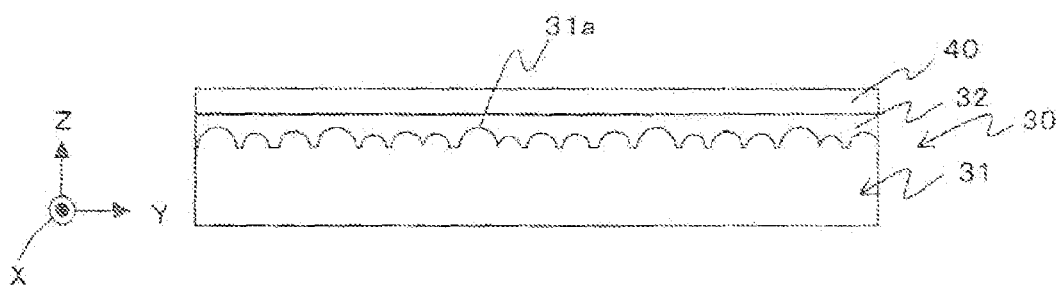
FIG. 5 is a diagram showing a first modification of the first embodiment of the present invention.

Next, a first modification of the first embodiment of the present invention will be described. FIG. 5 is a diagram showing the first modification of the first embodiment according to the present invention. In the first modification of the first embodiment of the present invention, a flattening sheet 40 with a flat surface is laminated on the surface of the isotropic material part 32. Preferably the flattening sheet 40 is a sheet with an isotropic refractive index. In the case of using a sheet with an anisotropic refractive index as the flattening sheet 40, the flattening sheet 40 is provided so that the optic axis of the flattening sheet 40 is parallel to the optic axis of the refractive index anisotropic sheet 31. In this way, the flattening sheet 40 is attached to the surface of the isotropic material part 32, in order to reduce the thickness of the isotropic material part 32 while making smoother the surface of the anisotropic diffusion sheet 30 on the side of the liquid crystal panel 10. As a result, it is possible to further reduce the amount of light scattered by the surface.

Figure 6:
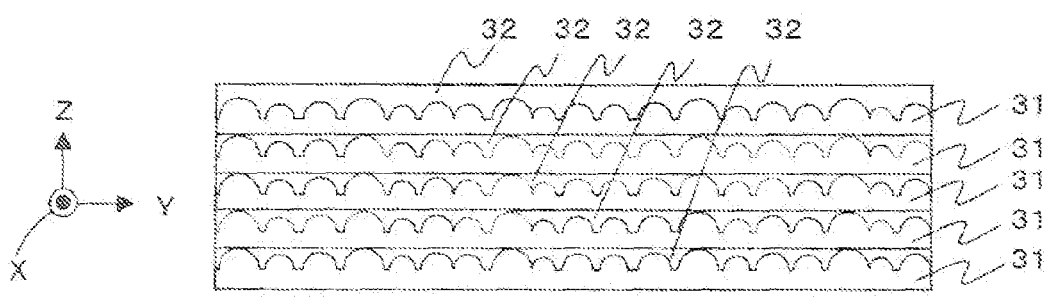
FIG. 6 is a diagram showing a second modification of the first embodiment of the present invention.

Next, a second modification of the first embodiment of the present invention will be described. FIG. 6 is a diagram showing the second modification of the first embodiment according to the present invention. In the second modification of the first embodiment of the present invention, a plurality of refractive index anisotropic sheets 31 and a plurality of isotropic material parts 32 are alternately laminated. In other words, a plurality of anisotropic diffusion sheets 30 are laminated together. In this way, a plurality of anisotropic diffusion sheets 30 are laminated together to scatter more of the linearly polarized light reflected by the reflective polarizing plate 16 in the transmission axis direction. As a result, the scattered light is depolarized.

Figure 7:
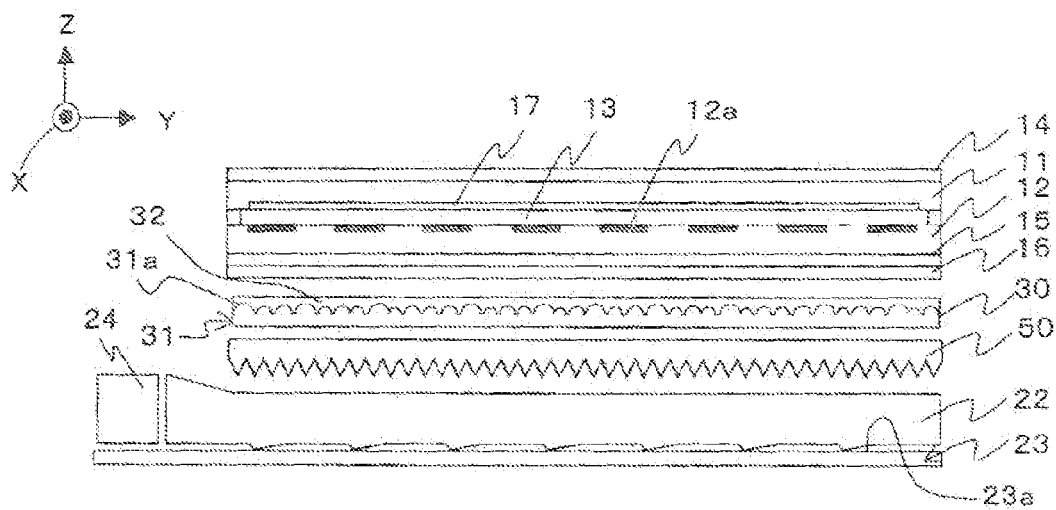
FIG. 7 is a diagram showing a third modification of the first embodiment of the present invention.

Next, a third modification of the first embodiment of the present invention will be described. FIG. 7 is a diagram showing the third modification of the first embodiment according to the present invention. In the third modification of the first embodiment of the present invention, the liquid crystal display device 1 has a reverse prism sheet 50 in place of the prism sheet 21. The reverse prism sheet 50 is used to totally reflect the light output from the light guide plate 22 towards the front of the back side of the liquid crystal panel 10. The reflected light from the liquid crystal panel 10, namely, the reflected light from the reflective polarizing plate 16, or the reflected light from the wiring 12a and the like of the liquid crystal panel 10 after being transmitted through the back-side polarizing plate 15, is totally reflected by the reverse prism sheet 50 and is returned to the light guide plate 22. Thus, it is possible to reduce the degree of depolarization by the reverse prism sheet 50 to a smaller value.

Note that also in the reverse prism sheet 50, similarly to the prism sheet 21, the view angle in the direction perpendicular to the ridge L of the prism is small, and the polarization in the direction perpendicular to the ridge L is apt to be strong. For this reason, it is preferable that the direction of the transmission axis of the back-side polarizing plate 15 and the direction of the optic axis of the anisotropic diffusion sheet 30 are set to the same directions as those in the first embodiment.

Figure 8:
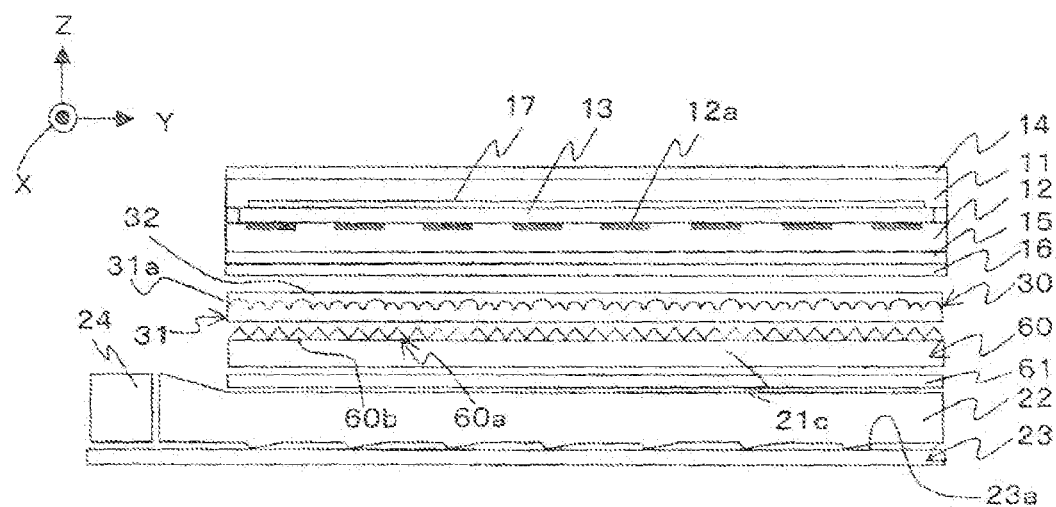
FIG. 8 is a diagram showing a fourth modification of the first embodiment of the present invention.

Next, a fourth modification of the first embodiment of the present invention will be described. FIG. 8 is a diagram showing the fourth modification of the first embodiment according to the present invention. In the fourth modification of the first embodiment of the present invention, the liquid crystal display device 1 has a prism sheet 60 in place of the prism sheet 21. The prism sheet 60 includes a prism row part 60a in which prisms 60b are formed in a row. The prism 60b has a cross section orthogonal to the X axis direction that is a right triangle with the right angle.

The diffusion sheet 61 has a function of diffusing and directing the light to the front of the back side of the liquid crystal panel 10. The diffusion sheet 61 is provided between the prism sheet 60 and the light guide plate 22. The diffusion sheet 61 is provided in this way to direct the brightness peak to the front of the back side of the liquid crystal panel 10. In order to reduce the degree of the depolarization in the diffusion sheet 61, the optic axis of the diffusion sheet 61 is aligned parallel or perpendicular to the ridges L of the individual prisms 60b of the prism sheet 60.

Note that a plurality of prism sheets 60 may also be used. For example, when two prism sheets 60 are arranged with the ridges L of the prisms 60b crossing each other, the ridges L of the prisms 60b are arranged parallel to the transmission axis of the back-side polarizing plate 15 or to the absorption axis. In this case, it is preferable that the two prism sheets 60 are arranged so that the rigid L of the prism 60b near the liquid crystal panel 10 is the absorption axis direction of the back-side polarizing plate 15, and that the rigid L of the prism 60b far from the liquid crystal panel 10 is the transmission axis direction.

Second Embodiment

Figure 9:
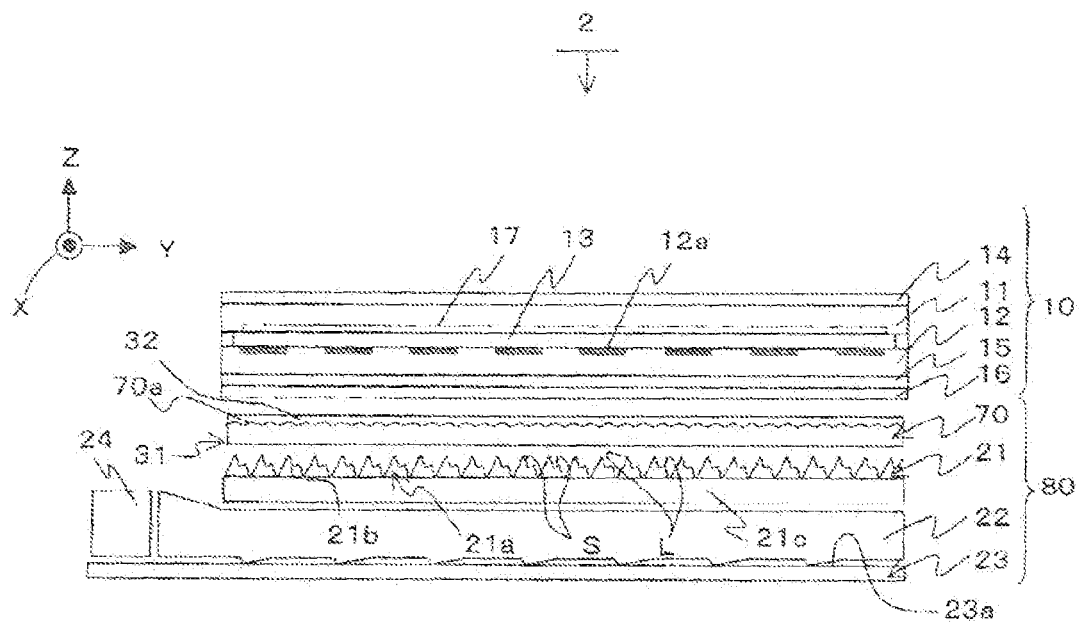
FIG. 9 is a schematic diagram of the general configuration of a liquid crystal display device according to a second embodiment of the present invention.
Figure 10:
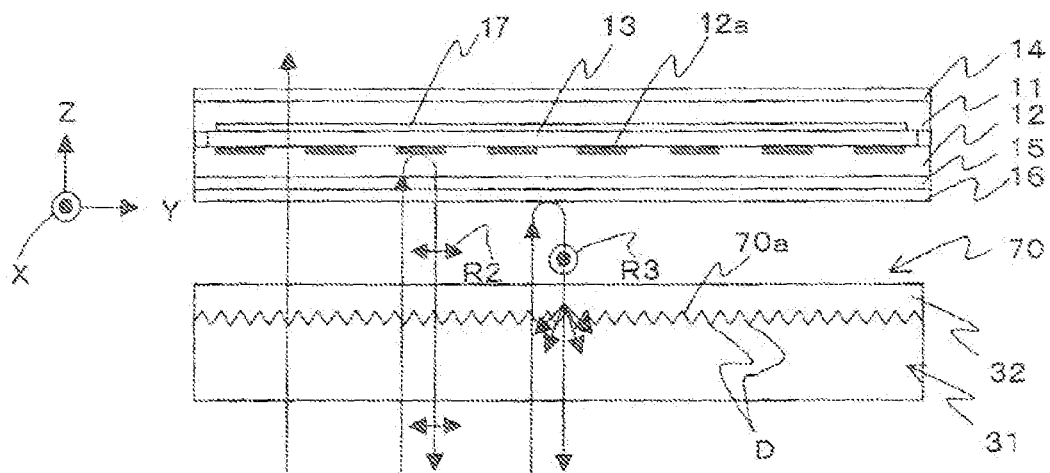
FIG. 10 is a diagram showing the linearly polarized light transmitted with the polarization kept in the anisotropic diffusion sheet, as well as the linearly polarized light diffracted and depolarized.

Next, a liquid crystal display device of a second embodiment according to the present invention will be described. FIG. 9 is a schematic diagram of the general configuration of a liquid crystal display device 2 according to the second embodiment of the present invention. FIG. 10 is a diagram showing the linearly polarized light R2 that is transmitted with the polarization kept in an anisotropic diffusion sheet 70, and the linearly polarized Light R3 that is diffracted and depolarized.

In the liquid crystal display device 1 according to the first embodiment of the present invention, the light is scattered by the concave-convex portion 31a. As a result, the scattered light is depolarized. However, in the liquid crystal display device 2, the light is diffracted and then depolarized.

The liquid crystal display device 2 has the anisotropic diffusion sheet 70 in place of the anisotropic diffusion sheet 30 used in the liquid crystal display device 1 of the first embodiment. The anisotropic diffusion sheet 70 has, instead of the concave-convex portion 31a, a diffraction grating 70a formed in a concave convex shape on the refractive index anisotropic sheet 31. The configuration other than the diffraction grating 70a is the same as that of the first embodiment, so that the same components are denoted by the same reference numerals.

As shown in FIG. 10, the diffraction grating 70a has a cross section orthogonal to the X axis direction that is a triangular shape. The diffraction grating 70a is used to change the direction of travel of light by diffracting the polarized light reflected from the reflective polarizing plate 16.

In the diffraction grating 70a, the direction of each grating groove D is arranged in the same direction as the direction of the ridge L of the prism 21b. In this way, the linearly polarized light reflected by the reflective polarizing plate 16 is diffracted in the direction perpendicular to the ridge L of the prism 21b. With this arrangement, although the view angle is small in the direction perpendicular to the ridge L of the prism 21b, the view angle is increased by the diffraction grating 70a.

When the diffraction grating 70a is arranged as described above, the direction of each grating groove D of the diffraction grating 70a is perpendicular to the transmission axis of the back-side polarizing plate 15. The linearly polarized light reflected by the reflective polarizing plate 16 is input mainly as TE polarization into the diffractive gating 70a. For this reason, the grating constant and the grating groove depth for the diffraction grating 70a are set to satisfy the following conditions: the zeroth-order diffraction efficiency of the grating for the TE polarization is low; and the TE polarization is diffracted into higher orders.

With the backlight 80 described above, as shown in FIG. 10, the linearly polarized light R3 in the X axis direction (the absorption axis direction) that is reflected by the reflective polarizing plate 16 and then returned in the direction of the backlight 80 is input to the isotropic material part 32. Since the surface of the isotropic material part 32 is flat, the linearly polarized light R3 is prevented from being scattered and is input to the isotropic material part 32.

Then, the linearly polarized light R3 enters the boundary between the isotropic material part 32 and the refractive index diffusion sheet 31. The linearly polarized light R3 is diffracted on the surface of the diffraction grating 70a by the difference $|nx-nt|$ in the refractive index between the isotropic material part 32 and the refractive index diffusion sheet 31. As a result, the diffracted light is depolarized. In the diffraction grating 70a, the direction of each grating groove D of the diffraction grating 70a is aligned with the direction of the ridge L of the prism 21b. With this arrangement, the diffraction grating 70a diffracts the linearly polarized light reflected from the reflective polarization plat 16, to the direction perpendicular to the X axis direction.

Further, the linearly polarized light R2 in the Y axis direction (the transmission axis direction) is transmitted through the back-side polarizing plate 15, and then reflected in the direction of the backlight 80 by the back side of the liquid crystal panel 10, such as the wiring 12a of the liquid crystal panel 10. The linearly polarized light R2 is input to the isotropic material part 32. Since the surface of the isotropic material is flat, the linearly polarized light R2 is prevented from being scattered and is input to the isotropic material part 32.

Then, the linearly polarized light R2 enters the boundary between the isotropic material part 32 and the refractive index anisotropic sheet 31. At this time, the linearly polarized light R2 is not diffracted because the refractive index ny in the Y axis direction of the refractive index anisotropic sheet 31 is the same as the refractive index nt of the isotropic material part 32. Thus, the linearly polarized light R2 is transmitted with the polarization kept in the Y axis direction through the anisotropic diffusion sheet 70.

In the liquid crystal display device 2 of the second embodiment of the present invention, the linearly polarized light in the absorption axis direction that is reflected from the reflective polarizing plate 16 and then returned in the direction of the backlight 80 is diffracted on the surface of the diffraction grating 70a by the difference in the refractive index between the isotropic material part 32 and the refractive index anisotropic sheet 31. As a result, the diffracted light is depolarized. On the other hand, the linearly polarized light in the transmission axis direction is transmitted through the back-side polarizing plate 15 of the liquid crystal panel 10, and then reflected in the direction of the backlight 80 by the back side of the liquid crystal panel 10, such as the wiring 12a of the liquid crystal panel 10. At this time, the linearly polarized light is not scattered because the refractive index in the transmission axis direction of the refractive index anisotropic sheet 31 is the same as the refractive index of the isotropic material part 32. Thus, the linearly polarized light is transmitted with the polarization in the transmission axis direction through the anisotropic diffusion sheet 70. This can increase the efficiency of reuse of the light reflected by the back side of the liquid crystal panel 10. As a result, it is possible to increase the brightness while reducing power consumption.

Figure 11:
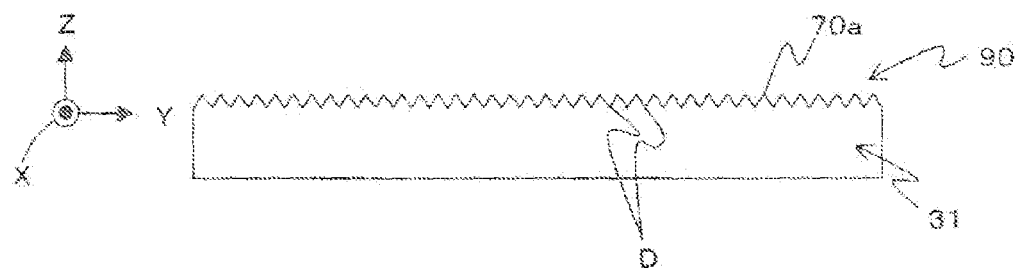
FIG. 11 is a diagram showing a modification of the second embodiment of the present invention.

Next, a modification of the second embodiment of the present invention will be described. FIG. 11 is a diagram showing a modification of the second embodiment according to the present invention. In the modification of the second embodiment of the present invention, the anisotropic diffusion sheet 70 does not have the isotropic material part 32. In other words, it is configured to have an anisotropic diffusion sheet 90 with only the refractive index anisotropic diffusion sheet 31 on which the diffraction grating 70a is formed.

The diffraction efficiency of the diffraction grating 70a varies for TM polarization and TE polarization. For this reason, the polarization direction, in which the zeroth-order diffraction efficiency is low and the high-order diffraction efficiency is high, is aligned with the direction of the polarized light reflected by the reflective polarizing plate 16.

In the refractive index anisotropic sheet 31, the delay phase axis or the advance phase axis is perpendicular to the grooves D of the diffraction grating 70a, in order not to break the polarization of light diffracted by the diffraction grating 70a. Note that a sheet with an isotropic refractive index can also be used as the refractive index anisotropic sheet 31.

Further, when the grating constant of the diffraction grating 70a is reduced to a smaller value than the wavelength of the light, the high-order diffractive efficiency increases for the TE polarization of light at a wavelength greater than the grating constant, and the high-order diffractive efficiency decreases for the TM polarization thereof. In this case, the diffraction grating 70a is arranged so that the linearly polarized Light, which is reflected by the reflective polarizing plate 16 in the absorption axis direction, is input as the TE polarization into the diffraction grating 70a. In other words, the refractive index diffusion sheet 31 is arranged so that the grooves D of the diffraction grating 70a are parallel to the absorption axis direction.

Although the first and second embodiments of the present invention show that the refractive index anisotropic sheet 31 is the uniaxially anisotropic sheet, the present invention is not limited to the particular embodiments. The only requirement is that the refractive index anisotropic sheet 31 should satisfy the relation |nx−nz|>|ny−nz|, where nx, ny, and nz are the refractive indices in the X, Y, and Z directions. For example, the refractive index anisotropic sheet 31 may be a biaxially anisotropic sheet.

In the first and second embodiments of the present invention, the refractive index anisotropic sheet 31 uses the uniaxially stretched PET. However, the refractive index anisotropic sheet 31 is not limited to the PET. For example, it is also possible to use uniaxially stretched polyether nitrile (PEN). In this case, for example, the refractive index ne and the refractive index n0 are set to n0=1.56 and ne=1.86, respectively.

Further, in the first and second embodiments of the present invention, the transmission axis of the back-side polarizing plate 15 is the Y axis and the absorption axis of the back-side polarizing plate 15 is the X axis. It is arranged such that the X and Y axes are parallel or perpendicular to the side of the edge of the light guide plate 22. However, the back-side polarizing plate 15 can be tilted to such a degree that the X and Y axes are effectively considered to be parallel or perpendicular to the side of the edge of the light guide plate 22. When the angle between the X and Y axes relative to the side of the edge of the light guide plate 22 is greater than 0° and smaller than 15° or 10°, or is smaller than 90° and greater than 75° or 80°, the X axis and Y axis can be considered to be effectively parallel or perpendicular to the side of the edge of the light guide plate 22.

It is to be understood that the present invention is not limited to the first and second embodiments.

What is claimed is:

1. A liquid crystal display device comprising:
   a reflective polarizing plate provided on a back side of a liquid crystal panel, to reflect linearly polarized light in an absorption axis direction of the polarizing plate towards a direction of a backlight, and transmit linearly polarized light in a transmission axis direction of the polarizing plate; and
   an optical path converter in which a prism row is formed to direct light output from a light guide plate towards the liquid crystal panel,
   wherein the backlight has an anisotropic diffusion sheet disposed between the reflective polarizing plate and the optical path converter,
   wherein the anisotropic diffusion sheet includes:
   a refractive index nx of anisotropic sheet stretched in the absorption axis direction, in which a concave-convex portion is formed in a concave convex shape on a surface on the side of the reflective polarizing plate;
   an isotropic material part laminated on a surface of the concave-convex portion, having an isotropic refractive index nt,
   wherein the refractive index nt of the isotropic material part is the same as a refractive index ny in the direction perpendicular in plane to a stretching direction of the refractive index anisotropic sheet,
   wherein nx>ny, and
   wherein depolarization of light reflected from the reflective polarizing plate by the anisotropic diffusion sheet is greater than depolarization of light reflected from the liquid crystal panel by the anisotropic diffusion sheet.

2. The liquid crystal display device according to claim 1, wherein the anisotropic diffusion sheet is configured such that an absolute value of a difference between the refractive index nx in the absorption axis direction and a refractive index nz in a thickness direction is greater than an absolute value of a difference between the refractive index ny in the direction perpendicular in plane to a stretching direction and the refractive index nz in the thickness direction.

3. The liquid crystal display device according to claim 1, wherein the concave-convex portion has a plurality of convex portions formed in an elliptical shape, and
wherein the convex portions have a bottom cross section orthogonal to the thickness direction, in which a longitudinal direction is the stretching direction of the refractive index anisotropic sheet.

4. The liquid crystal display device according to claim 1, wherein the concave-convex portion is formed by a hot embossing process.

5. The liquid crystal display device according to claim 1, wherein the anisotropic diffusion sheet is formed by laminating a flattening sheet having a flat surface on a surface of the isotropic material part.

6. The liquid crystal display device according to claim 1, wherein the anisotropic diffusion sheet is formed by laminating a plurality of sheets.

7. The liquid crystal display device according to claim 1, wherein the concave-convex portion is a diffraction grating formed in a concave convex shape.

* * * * *

UNITED STATES PATENT AND TRADEMARK OFFICE
CERTIFICATE OF CORRECTION

PATENT NO.        : 8,730,431 B2                          Page 1 of 1
APPLICATION NO.   : 13/227700
DATED             : May 20, 2014
INVENTOR(S)       : Tatsuya Sugita et al.

It is certified that error appears in the above-identified patent and that said Letters Patent is hereby corrected as shown below:

In the Specification

Column 5, line 4, change "were" to --where--;
Column 5, line 60, change "ny-nz=n0" to --ny=nz=n0--;
Column 10, line 61, change "Light" to --light--; and
Column 12, line 58, change "Light" to --light--.

Signed and Sealed this
Twelfth Day of August, 2014

Michelle K. Lee
*Deputy Director of the United States Patent and Trademark Office*